(12) United States Patent
Aoyama (10) Patent No.: US 7,535,203 B2
(45) Date of Patent: May 19, 2009

(54) ALTERNATOR

(75) Inventor: Toru Aoyama, Okazaki (JP)

(73) Assignee: Denso Corporation, Kariya (JP)

( * ) Notice: Subject to any disclaimer, the term of this patent is extended or adjusted under 35 U.S.C. 154(b) by 243 days.

(21) Appl. No.: 11/702,515

(22) Filed: Feb. 6, 2007

(65) Prior Publication Data
US 2007/0182382 A1    Aug. 9, 2007

(30) Foreign Application Priority Data

Feb. 8, 2006    (JP) ............................. 2006-031282
Sep. 5, 2006    (JP) ............................. 2006-240470

(51) Int. Cl.
*H02P 9/00*    (2006.01)

(52) U.S. Cl. .......................................... 322/24; 322/28

(58) Field of Classification Search ................. 322/22, 322/23, 24, 25, 28, 27, 37, 99
See application file for complete search history.

(56) References Cited

U.S. PATENT DOCUMENTS

| | | | | |
|---|---|---|---|---|
| 4,453,120 A | * | 6/1984 | Bauer | ........................... 322/28 |
| 4,591,775 A | * | 5/1986 | Nussel et al. | ................ 318/711 |
| 4,723,106 A | * | 2/1988 | Gibbs et al. | ................... 322/26 |
| 4,739,243 A | | 4/1988 | Iwatani et al. | |
| 4,743,777 A | * | 5/1988 | Shilling et al. | ................ 290/46 |
| 5,157,321 A | | 10/1992 | Kato et al. | |
| 5,510,695 A | | 4/1996 | Tanaka et al. | |
| 5,764,036 A | * | 6/1998 | Vaidya et al. | .................. 322/90 |
| 7,154,249 B2 | * | 12/2006 | Velhner et al. | ................ 322/59 |
| 7,227,271 B2 | * | 6/2007 | Anghel et al. | ................. 290/31 |
| 7,245,112 B2 | * | 7/2007 | Velhner et al. | ................ 322/59 |
| 7,388,300 B2 | * | 6/2008 | Anghel et al. | ................. 290/39 |
| 7,400,056 B2 | * | 7/2008 | McGinley et al. | ............. 290/46 |

FOREIGN PATENT DOCUMENTS

| | | |
|---|---|---|
| JP | A 62-104500 | 5/1987 |
| JP | A 3-60338 | 3/1991 |
| JP | A 5-38113 | 2/1993 |
| JP | A 5-38114 | 2/1993 |
| JP | A 6-178459 | 6/1994 |
| JP | A 6-197600 | 7/1994 |
| JP | A 6-225473 | 8/1994 |
| JP | A 7-39199 | 2/1995 |

* cited by examiner

*Primary Examiner*—Nicholas Ponomarenko
(74) *Attorney, Agent, or Firm*—Oliff & Berridge PLC (57) ABSTRACT

An alternator comprises: an output rectifier converting AC voltage produced in an output armature winding into DC and supplying the DC electric power to a rechargeable battery and a current consumer; an excitation rectifier which is electrically separated from the output rectifier to convert AC voltage produced in an excitation armature winding into DC; and a power generation control unit. The power generation control unit compares the output voltage of the output rectifier or the terminal voltage of the battery with a predetermined reference voltage and controls current supplied to an excitation winding to which the DC voltage outputted from the excitation rectifier is applied, based on the comparison result.

11 Claims, 6 Drawing Sheets

INPUT SIGNAL TO PLUS TERMINAL OF VOLTAGE COMPARATOR 271

FIG. 5B

OUTPUT SIGNAL OF VOLTAGE COMPARATOR 271

FIG. 5C

OUTPUT SIGNAL OF OFF-CIRCUIT 272

FIG. 5D

MAGNETIZING CURRENT $I_f$

FIG. 6

ALTERNATOR

CROSS-REFERENCE TO RELATED APPLICATION

This application is based on and claims the benefit of priorities from earlier Japanese Patent Application No. 2006-031282 filed Feb. 8, 2006, and Japanese Patent Application No. 2006-240470 filed Sep. 5, 2006, the description of which is incorporated herein by reference.

BACKGROUND OF THE INVENTION

1. Technical Field of the Invention

The present invention relates to an alternator, and in particular, to an alternator to be loaded on a passenger car or a truck, for example.

2. Related Art

An alternator for a vehicle (hereinafter referred to just as an "alternator") is loaded on an engine to charge a battery or supply current to on-vehicle machinery which imposes electrical loading (hereinafter referred to as a "current consumer").

For example, as described in Japanese Patent Application Laid-Open No. 3-060338, an alternator generally includes a rotor, an excitation winding, a stator, a rectifier and a voltage regulator, which are all integrally constructed (refer to pp., 2 to 6 and FIGS. 1 to 6).

The rotor has field poles which are magnetized by the excitation winding. The stator has an armature winding which generates electric power by receiving magnetic flux from the field poles. The rectifier full-wave rectifies the AC output that has been generated by the armature winding for conversion into DC. The output voltage produced in this way is then regulated by the voltage regulator. Thus, the alternator outputs DC current with regulated output voltage.

Electric power control in such an alternator is performed by detecting battery voltage and increasing/decreasing current to be supplied to the excitation winding through a brush for adjustment of the amount of magnetic flux in the magnetic field.

Electronics devices for improving safety and comfortable driving have recently come to be loaded on vehicles, and this tends to increase electrical power consumption in vehicles. On the other hand, since more importance is placed on environmental protection or natural resources saving, vehicles are now required to provide more improved fuel consumption. In order to improve fuel consumption, low idling of engine has been pursued further, or reduction in size and weight has been pursued for the apparatuses to be loaded on vehicles, including the alternator mentioned above. These measures for improving fuel consumption, however, also require suitable electronics devices, so that the tendency of increasing electrical power consumption has been reinforced. In this way, sufficient electric power generation is unlikely to be achieved in vehicles currently.

Under the circumstances as mentioned above, it has been required that alternators should more increasingly generate electric power than ever in a low-speed region of engine revolution ("a low-speed region of engine revolution" hereinafter abbreviated as "a low-speed region"), where power-generating performance is low, to afford electric power to be supplied to the electronics devices.

However, in an alternator, in general, electric current equal to or more than a current value determined by battery charge voltage cannot be supplied to the excitation winding. Therefore, it is not easy to increase a maximum output current. One approach may be to enlarge the size of the alternator and supply that much more electric power. This approach, however, may increase the output current, while deteriorating feasibility of loading the alternator on a vehicle and impeding reduction in the weight of the vehicle, and thus may raise problems if put into practice.

Another known technique for increasing electric power generation without deteriorating the feasibility of loading an alternator is suggested in Japanese Patent Laid-Open No. 6-225473, for example, in which current supplied to an excitation winding is supplied by a separately provided power source external to the alternator (refer to pp., 3 to 7 and FIGS. 1 to 4). Use of a separately provided power source may enable increase of voltage to be applied to the excitation winding to thereby increase the electric power generation by that much.

In the technique disclosed in Japanese Patent Laid-Open No. 6-225473, the separately provided power source external to the alternator has a configuration in which a wiring is drawn from the armature winding of the alternator to take out three-phase AC voltage, which voltage is then boosted by a three-phase transformer and rectified, and this rectified voltage is applied to an excitation winding through the wiring again. The configuration is also provided with a switch for switching between self excitation and separate excitation. This configuration has a problem that various additional parts, such as a wiring, a transformer, a rectifier and a switch, are required. Further, the separately provided power source which is used only for exciting the alternator is so large that it constitutes a factor for impeding weight reduction of a vehicle.

In addition, the voltage induced in the armature winding of the alternator is in proportion to the number of revolutions of a magnetized rotor. Thus, when electric power is generated in a high-speed region of engine revolution ("a high-speed region of engine revolution" hereinafter abbreviated as "a high-speed region") by utilizing this configuration, the voltage applied to the excitation winding (i.e. the voltage boosted and rectified by the three-phase transformer) becomes so large that, although the current flowing through the excitation winding is increased, heat built up in the excitation winding itself is also problematically increased. As a result, deterioration is accelerated in the insulating film of the copper wire constructing the excitation winding to resultantly shorten the life of the insulating film, making it difficult to provide an operation which is stable for a long period of time.

A separate-excitation type configuration in which one end of the excitation winding of an alternator is connected to an externally provided separate power source may be realized by connecting the alternator to a battery directly or through a DC-DC converter.

In case electric power is supplied to the alternator through the DC-DC converter, such additional parts as the DC-DC converter, a wiring and a switch are required. Moreover, although the DC-DC converter has a large size and contributes to increasing the amount of power generation, it does not satisfy the requirements of reduced size and weight of a vehicle.

In case electric power is directly supplied from the battery to the alternator, the connection between the battery and the excitation winding of the alternator is made, for example, via a switch and a wiring. Therefore, the voltage decreases due to the wiring resistance, for example. Comparing with a self-excitation type configuration, the separate-excitation type configuration reduces current that can be supplied to the excitation wiring, whereby the output current of the alternator is problematically reduced.

SUMMARY OF THE INVENTION

The present invention has been made in light of the problems described above, and has an object of providing an alternator which is able to provide a small and light electric power generation system including the alternator without using a separate power source.

Another object of the present invention is to provide an alternator which is able to suppress heat evolution in the excitation wiring and ensure an operation which is stable for a long period of time.

The present invention provides an alternator comprising a plurality of generating sections generating electric power and a controller for controlling an amount of the electric power supplied to an output of the alternator and to the generating sections for generating the electric power.

Preferably, The present invention provides an alternator comprising a rotator having a magnetic pole and an excitation winding for exciting the magnetic pole, a stator having a first and second stator windings, generating a first and second alternating current passing through the first and second stator windings respectively in response to a rotating magnetic field generated by the rotator, a first rectifier rectifying the first alternating current generated across the first stator winding, a second rectifier rectifying the second alternating current generated across the second stator winding, and a controller configured to control an amount of power generated from the alternator in reply to an output voltage of the first rectifier.

DETAILED DESCRIPTION OF THE PREFERRED EMBODIMENTS

1. First Embodiment

Figure 1:
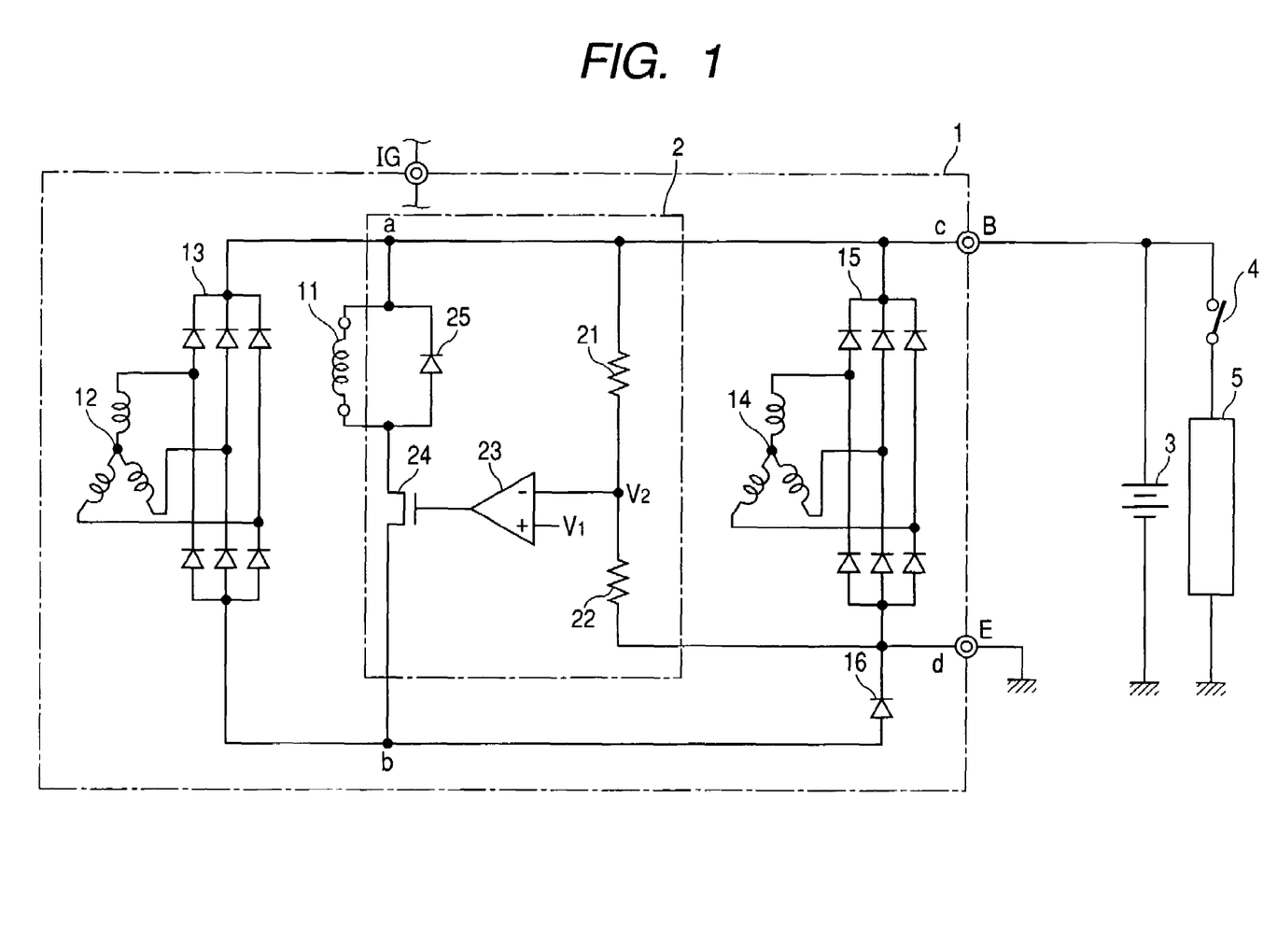
FIG. 1 is a block diagram showing a configuration of an alternator according to a first embodiment of the present invention.

With reference to FIG. 1, an alternator 1 according to a first embodiment of the present invention is described below in the order of its configuration, operation and advantages.

1.1 Configuration

FIG. 1 is a block diagram showing the configuration of the alternator 1 according to the first embodiment from an electrical circuit view. FIG. 1 also shows a state of electrical connections between the alternator, a battery, etc.

As shown in FIG. 1, the alternator 1 comprises an excitation winding 11, an excitation armature winding 12, an excitation rectifier 13 (hereinafter referred to as a "first rectifier 13"), an output armature winding 14, an output rectifier 15 (hereinafter referred to as a "second rectifier 15"), a rectifying element 16 and a power generation unit 2.

The excitation armature winding 12 is provided for exciting the excitation winding 11 so as to enable the alternator 1 to generate electric power, while the output armature winding 14 is provided for supplying electric power generated therefrom to an output terminal B of the alternator as a power output of the alternator 1.

The excitation armature winding 12 has a three-phase Y-connection and is connected to the first rectifier 13. A positive side of the first rectifier 13 is connected to one end of the excitation winding 11, and a negative side of the first rectifier 13 is connected to the other end of the excitation winding 11 through a switching element 24. This first rectifier 13 is electrically separated from the second rectifier 15 through the rectifying element 16.

The output armature winding 14 has a three-phase Y-connection and is connected to the second rectifier 15. A positive side of the second rectifier 15 is connected to the B terminal serving as an output terminal for the alternator 1. The B terminal is connected such as to a battery 3 (also referred to as "power source 3") and a current consumer (imposing electrical loading) 5 (also referred to as "electric load 5") which are loaded on the vehicle. A switch 4 is arranged to connect the current consumer 5 to the B terminal of the alternator 1 therethrough. A negative side of the second rectifier 15 is connected to an E terminal serving as a ground terminal.

An anode side of the rectifying element 16 is connected to the negative side of the first rectifier 13, and a cathode side of the rectifying element 16 is connected to the negative side of the second rectifier 15. One end of the excitation winding 11 is connected to the B terminal, and the other end thereof is connected to the E terminal through the switching element 24 and the rectifying element 16.

Note that the alternator 1 is mechanically arranged for the armature windings 12 and 14 (which is also referred to as "stator windings") to be wounded around a single stator (not shown).

The output (generated electric power) of the alternator 1 varies depending on the number of revolutions of the rotor and an amount of excitation current flowing through the excitation winding 11. The excitation current is controlled by the power generation control unit 2.

The power generation control unit 2 is now explained. The power generation control unit 2 includes resistors 21 and 22, a voltage comparator 23, the switching element 24 and a circulating diode 25. The power generation control unit 2 constitutes power generation control means (which is also referred to as a "controller"). A reference voltage V1 is inputted to a plus input terminal of the voltage comparator 23. A voltage V2 divided by the resistors 21 and 22 to detect the output voltage of the alternator 1 is inputted to a minus input terminal of the comparator 23. The output voltage of the voltage comparator 23 drives the switching element 24.

The switching element 24 is made up, for example, of an MOS transistor with its gate being connected to an output of the voltage comparator 23, its drain being connected to the positive side of the first rectifier 13 through the circulating diode 25, and its source being connected to the negative side of the first rectifier 13. Also, the drain is connected to the excitation winding 11, whereby excitation current is passed to the excitation winding 11 when the switching element 24 is turned on, and the excitation current is stopped when the switching element 24 is turned off. The circulating diode 25 is connected in parallel with the excitation winding 11 so that the excitation current flowing through the excitation winding 11 is circulated when the switching element 24 is turned off.

1.2 Operations

<Operation Before Engine Startup>

When a key switch for the engine is turned on by a driver, battery voltage is applied to an IG (ignition) terminal of the power generation control unit 2 to operate a power source circuit, not shown, in the power generation control unit 2, so that the individual circuits are turned into active states (operable states).

The fact that the input voltage V2 for one of the two input terminals of the voltage comparator 23 is rendered to be lower than the reference voltage V1 for the other input terminal thereof (V2<V1). Therefore, the level of an output signal of the voltage comparator 23 becomes so high that the switching element 24 is turned on. Then, an initial excitation current is supplied from the battery 3 and flows through the excitation winding 11, the switching element 24 and the rectifier 16 (forward bias) to magnetize the rotor.

<Operation After Engine Startup>

When the engine is started and the rotor is rotated, a rotating magnetic field is created, by which an electromotive force of three-phase AC is produced in the excitation armature winding 12. Then, the produced three-phase AC voltage is subjected to full-wave rectification by the first rectifier 13, for conversion into DC voltage (hereinafter is referred to "excitation voltage Vab").

With the production of the excitation voltage Vab having larger potential difference than the battery voltage, the potential at the negative side of the first rectifier 13 becomes lower than the ground potential of the E terminal. In other words, the rectifying element 16 is reversely biased, and thus the initial excitation current that has been supplied from the battery 3 runs down. From this point onward, an excitation current is supplied by the self-produced excitation voltage Vab, instead of being supplied from the battery 3.

In this way, the rotor is magnetized by the excitation current supplied by the excitation voltage Vab, so that the electromotive force of three-phase AC is produced in the output armature winding 14. Then the produced three-phase AC voltage is subjected to full-wave rectification by the second rectifier 15, for conversion into DC voltage (hereinafter is referred to as "output voltage Vcd"), whereby electric power is supplied to the battery 3 and the current consumer 5.

After that, when the output voltage Vcd has reached a regulated voltage (e.g., 14.5 V) to raise the input voltage V2 of the voltage comparator 23 higher than the reference voltage V1 (equivalent to the regulated voltage 14.5 V) (V2>V1), the output signal of the voltage comparator 23 turns from high level to low level. In response, the switching element 24 is turned off, by which the excitation current is circulated via the circulating diode 25 and reduced to thereby reduce the output voltage Vcd of the alternator 1. Then, when the input voltage V2 of the voltage comparator 23 becomes lower than the reference voltage V1 (V2<V1), the switching element 24 is turned on again to increase the excitation current.

In this way, by performing the on/off control of the switching element 24 for control of the excitation current flowing through the excitation winding 11, the output voltage Vcd of the alternator 1 is regulated to a predetermined regulated voltage.

An explanation is now given on the case where the current consumer 5 is under use while the vehicle is driven (i.e., the case where the switch 4 has been turned on). If the power generation capacity of the alternator 1 is sufficiently large, the alternator 1 can charge the battery 3 and can supply power to the on-vehicle current consumer 5 with the output voltage Vcd controlled to be the predetermined regulated voltage (14.5 V).

If the current consumer 5 consumes electric power larger than the power generation capacity of the alternator 1, the electric power is compensated by the battery 3. Therefore, the voltage of the battery 3 is reduced, by which the output voltage Vcd of the alternator 1 becomes lower than the predetermined regulated voltage (14.5 V). This allows the input voltage V2 of the voltage comparator 23 to become lower than the reference voltage V1 (V2<V1), whereby the switching element 24 is turned on and the excitation winding 11 is supplied with full excitation current.

The full excitation current produces an electromotive force larger than the output voltage Vcd in the excitation armature winding 12. At the same time, the excitation winding 11 is applied with the excitation voltage Vab which is allowed to be produced in the excitation armature winding 12 of the alternator 1 (e.g., about 17V (>Vcd) for 1800 rpm of the alternator 1, which is equivalent to the proximity of idle rotation number of an engine) without being limited by the output voltage Vcd which is supplied to the battery 3 or the current consumer 5 from the alternator 1.

1.3 Advantages

In this way, the excitation voltage Vab which is higher than the battery voltage can be applied to the excitation wiring 11. Owing to this, a rotor having a strong magnetizing force can be constructed. Thus, comparing with the conventional alternator, in which power is generated with the voltage applied to the excitation winding being limited by the battery voltage, the output current to be supplied to the battery 3 and the current consumer 5 from the output armature winding 14 can be increased under a specific arrangement described below.

This specific arrangement is:

The output armature winding 14 is arranged to generate and supply a greater electric power to the electric power source 3 and the electrical load 5 than an electric power generated by the excitation armature winding 12 which supplies to the excitation winding 11.

This arrangement can be realized by adjusting, e.g., the wound number, diameters, and/or materials of the armature windings 12 and 14.

By choosing the arrangement mentioned above, the alternator having two generating sections (e.g., the armature windings 12 and 14) can increase an output electric power more than an output electric power generated by an alternator having a single generating section (e.g., a single armature winding), since the alternator having two generating sections can provide a higher electric voltage than the voltage provided by a battery connected to the alternator, e.g., the battery 3 to the excitation winding 11.

As described above, by contriving ways to apply the excitation voltage, the alternator 1 of the present embodiment is enabled to increase its electric power generation more than in the conventional alternator in which output has been increased by providing a large-size separate power source of a separate-excitation type. In other words, the alternator 1 of the present embodiment is enabled to increase its generated electric power more than that produced in the conventional alternator, without using an additional power source, such as the large-size separate power source locating at an outside of the alternator 1. The additional power source supplies current to the excitation winding 11 and enabling voltage to increase, which is applied to the excitation winding 11. Thus, the amount of the generated electric power by the alternator 1 is increased.

Moreover, the alternator 1 according to the present embodiment can incorporate therein a simple structure for obtaining boosting voltage to be applied to the excitation winding 11. Therefore, the feasibility of loading the alternator 1 on a vehicle will not be deteriorated. Further, since the alternator 1 according to the present embodiment does not have a separate power source unlike the conventional alternator, the weight and size of an electric generation system (i.e., a system comprising the alternator 1 and the battery 3) can be reduced relative to an electric generation system having a plurality of batteries.

Further, power consumption of the battery 3 can be reduced since the alternator 1 is a self-excitation type generator without using additional batteries.

2. Second Embodiment

Figure 2:
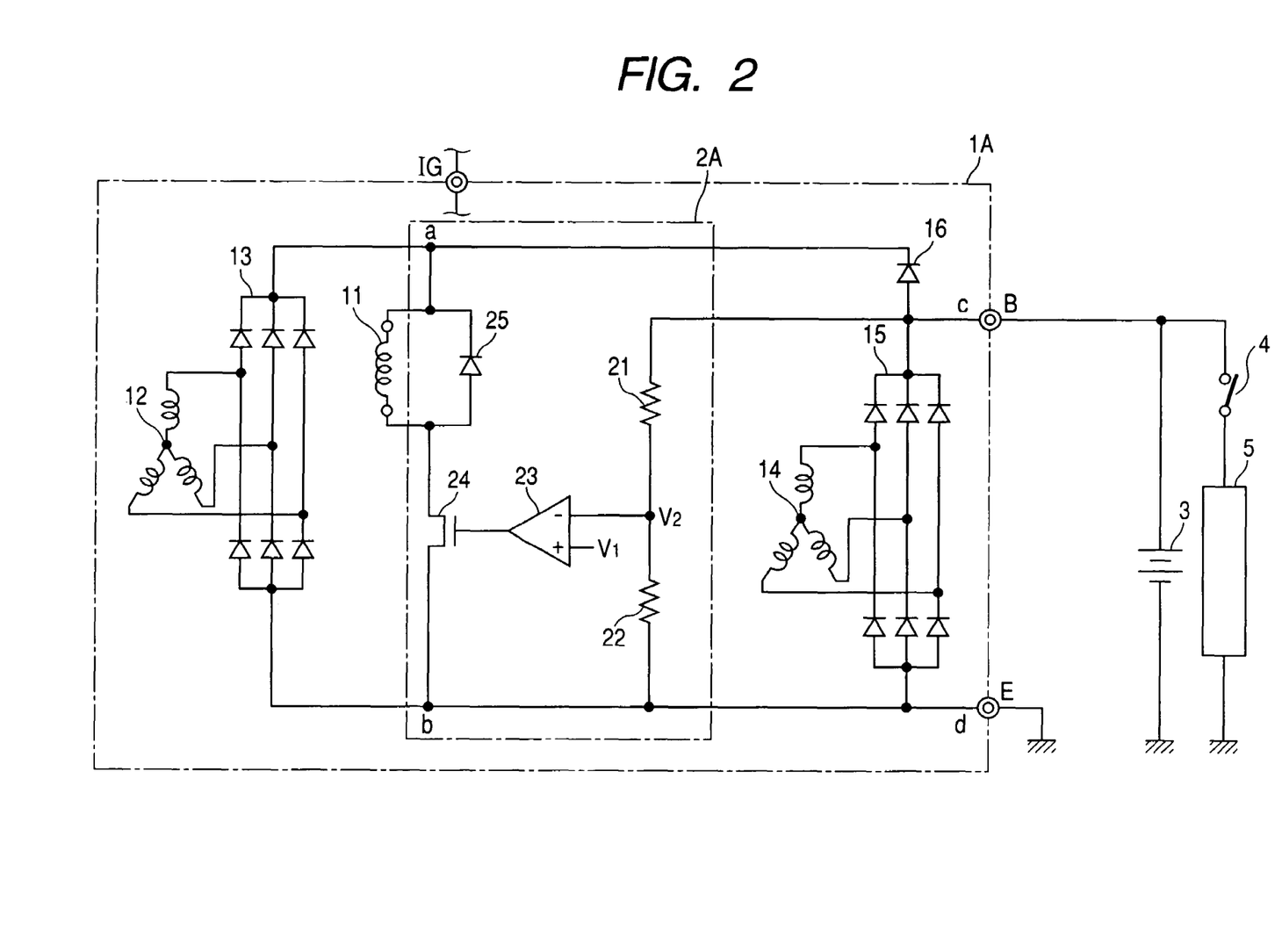
FIG. 2 is a block diagram showing a configuration of an alternator according to a second embodiment of the present invention.

Referring to FIG. 2, a second embodiment of the present invention will now be described.

FIG. 2 is a block diagram showing a configuration of an alternator according to a second embodiment of the present invention. FIG. 2 also shows a state of electrical connection between the alternator, a battery, etc. In the present embodiment, the identical or similar components or processes to those of the first embodiment are given the same references as in the first embodiment for the sake of simplification or omission of explanation.

As shown in FIG. 2, an alternator 1A of the present embodiment comprises the excitation winding 11, the excitation armature winding 12, the first rectifier (excitation rectifier) 13, the output armature winding 14, the second rectifier (output rectifier) 15, the rectifying element 16 and a power generation control unit 2A.

The alternator 1A of the present embodiment shown in FIG. 2 is different from the alternator 1 of the first embodiment shown in FIG. 1 in that the location of the rectifying element 16 has been changed. In other words, the configuration of the present embodiment can be obtained by changing connection of the excitation winding 11, the first rectifier 13, the switching element 24, the circulating diode 25 and the rectifying element 16, with respect to the alternator 1 of the first embodiment shown in FIG. 1.

Particularly, in the alternator 1A shown in FIG. 2, a positive side node "a" for the respective the excitation winding 11, the circulating diode 25 and the first rectifier 13 is connected to a plus side of the battery 3 through the rectifying element 16, and a negative side node "b" for the respective switching element 24 and the first rectifier 13 is connected to the E terminal and grounded. The operation of the rectifying element 16 is the same as the rectifying element 16 provided in the alternator 1 of the first embodiment. That is, the use of the rectifying element 16 enables electrical separation between the first rectifier 13 and the second rectifier 15.

In the configuration of the second embodiment, which is an alternation of the first embodiment, the alternator 1A can realize an operation equivalent to that of the first embodiment and provide advantages equivalent to those of the first embodiment.

For example, in both of the first and the second embodiments, the first rectifier 13 is connected to the second rectifier 15 through the rectifying element 16. Also, in both of the embodiments, the rectifying element 16 is connected in such a way that the rectifying element 16 is forwardly biased when the output voltage of the first rectifier 13 is lower than that of the second rectifier 15, and that reversely biased when the output voltage of the first rectifier 13 is higher than that of the second rectifier 15.

Owing to this configuration, the initial excitation current can be supplied from the battery 3 when the rectifying element 16 is forwardly biased. Contrarily, when the rectifying element 16 is reversely biased, the initial excitation current supplied from the battery 3 runs down, but the excitation current is supplied by the excitation voltage which is self-produced by the first rectifier 13.

As described above, two effects, i.e. firstly, supply of the initial excitation current, and secondly, electrical separation between the first rectifier 13 and the second rectifier 15, can be achieved with the simple configuration of employing the rectifying element 16.

3. Third Embodiment

Figure 3:
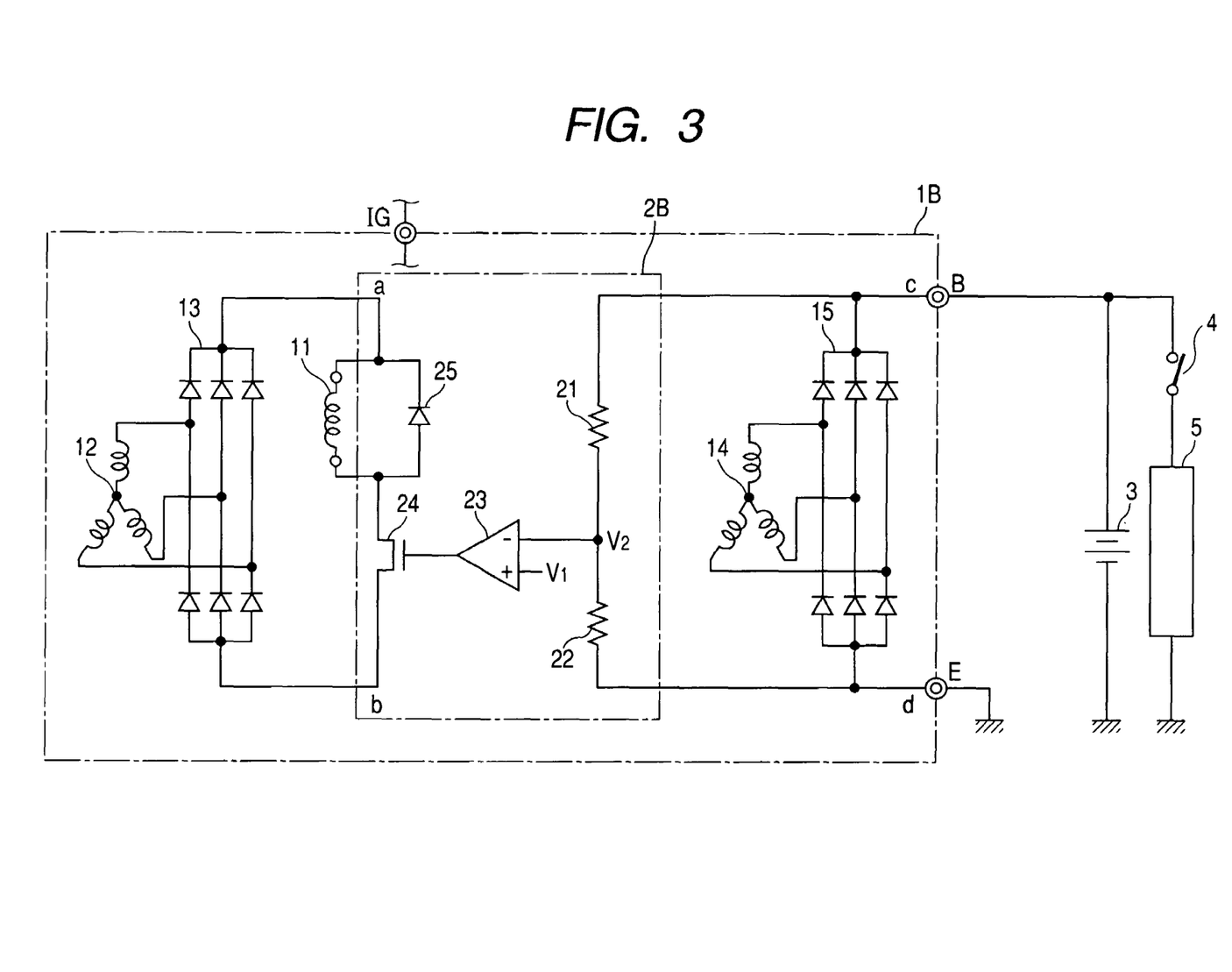
FIG. 3 is a block diagram showing a configuration of an alternator according to a third embodiment of the present invention.

Referring to FIG. 3, a third embodiment of the present invention will now be described.

In the alternator 1 and the alternator 1A of the first and the second embodiments described above, respectively, the first rectifier 13 and the second rectifier 15 have been electrically separated by employing the rectifying element 16, and the initial excitation current has been supplied to the excitation winding 11 through this rectifying element 16 from the battery 3. However, such a rectifying element can be omitted in a circuit configuration in which electric power can be generated with the rotation of the rotor without having to supply the initial excitation current (e.g., a circuit configuration employing a rotor which uses both a permanent magnet and an electromagnet). An alternator 1B of a third embodiment exemplifies such a circuit configuration.

FIG. 3 is a block diagram showing a configuration of the alternator 1B of the third embodiment. FIG. 3 also shows a state of electrical connection between the alternator, a battery, etc. In the present embodiment, the identical or similar components or processes are given the same references as in the first embodiment for the sake of simplification or omission of explanation.

As shown in FIG. 3, the alternator 1B of the present embodiment comprises the excitation winding 11, the excitation armature winding 12, the first rectifier (excitation rectifier) 13, the output armature winding 14, the second rectifier (output rectifier) 15 and a power generation control unit 2B.

In the alternator 1B shown in FIG. 3, the rectifying element 16 is omitted, and the first rectifier 13 and the second rectifier 15 are completely separated.

In the configuration of the third embodiment, which is an alternation of the first embodiment, the alternator 1B can realize an operation equivalent to that of the first embodiment and provide advantages equivalent to those of the first embodiment.

4. Fourth Embodiment

Figure 4:
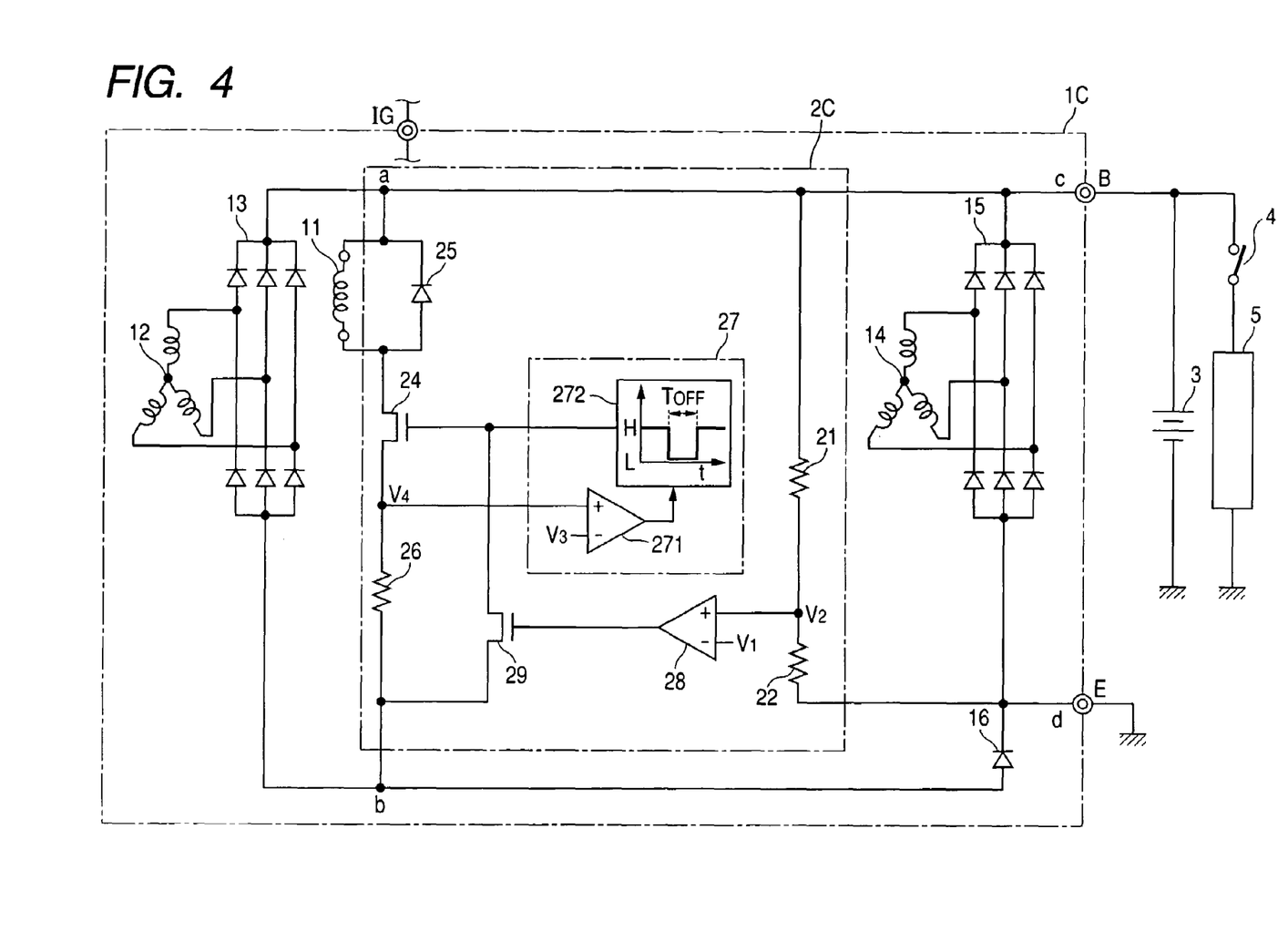
FIG. 4 is a block diagram showing a configuration of an alternator according to a fourth embodiment of the present invention.
Figure 5A:
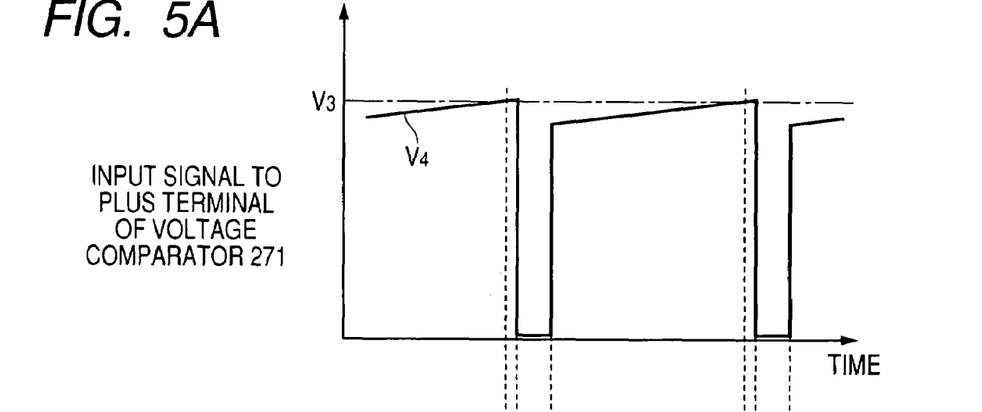
FIGS. 5A to 5D are diagrams showing operation timing of a power generation control unit in a high-speed region in the alternator according to the fourth embodiment of the present invention.
Figure 5B:
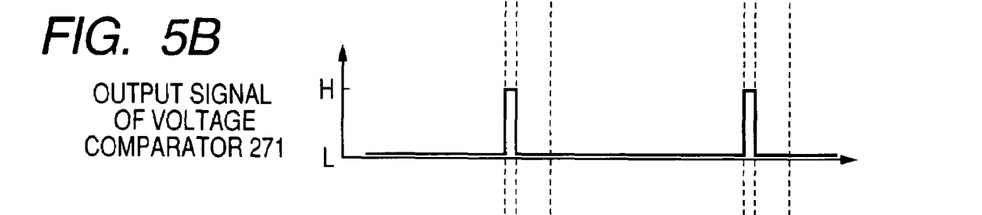
Figure 5C:
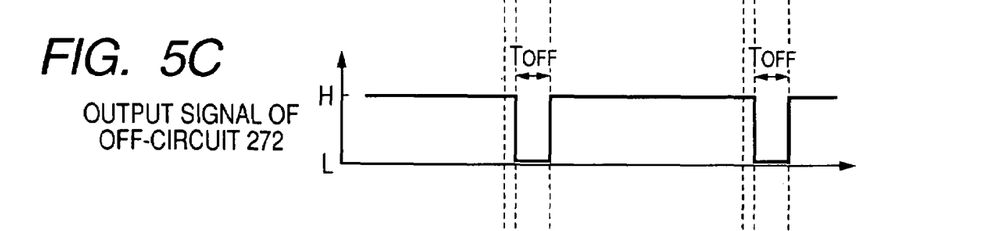
Figure 5D:
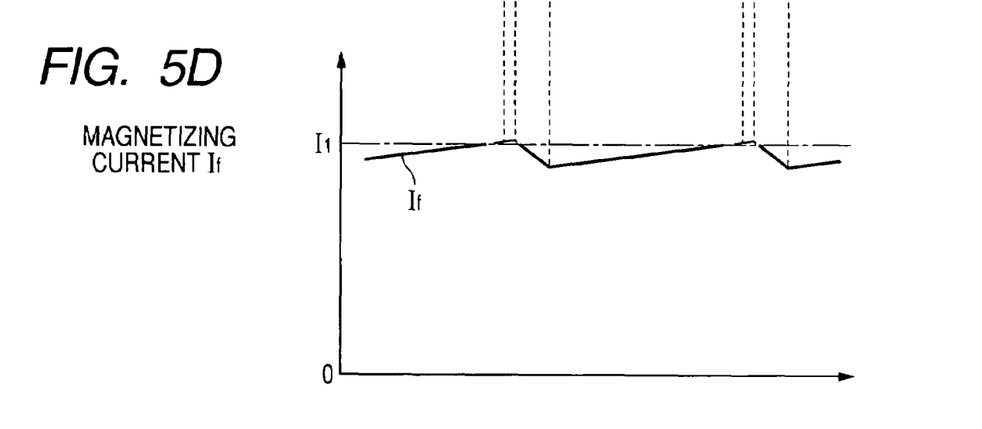
Figure 6:
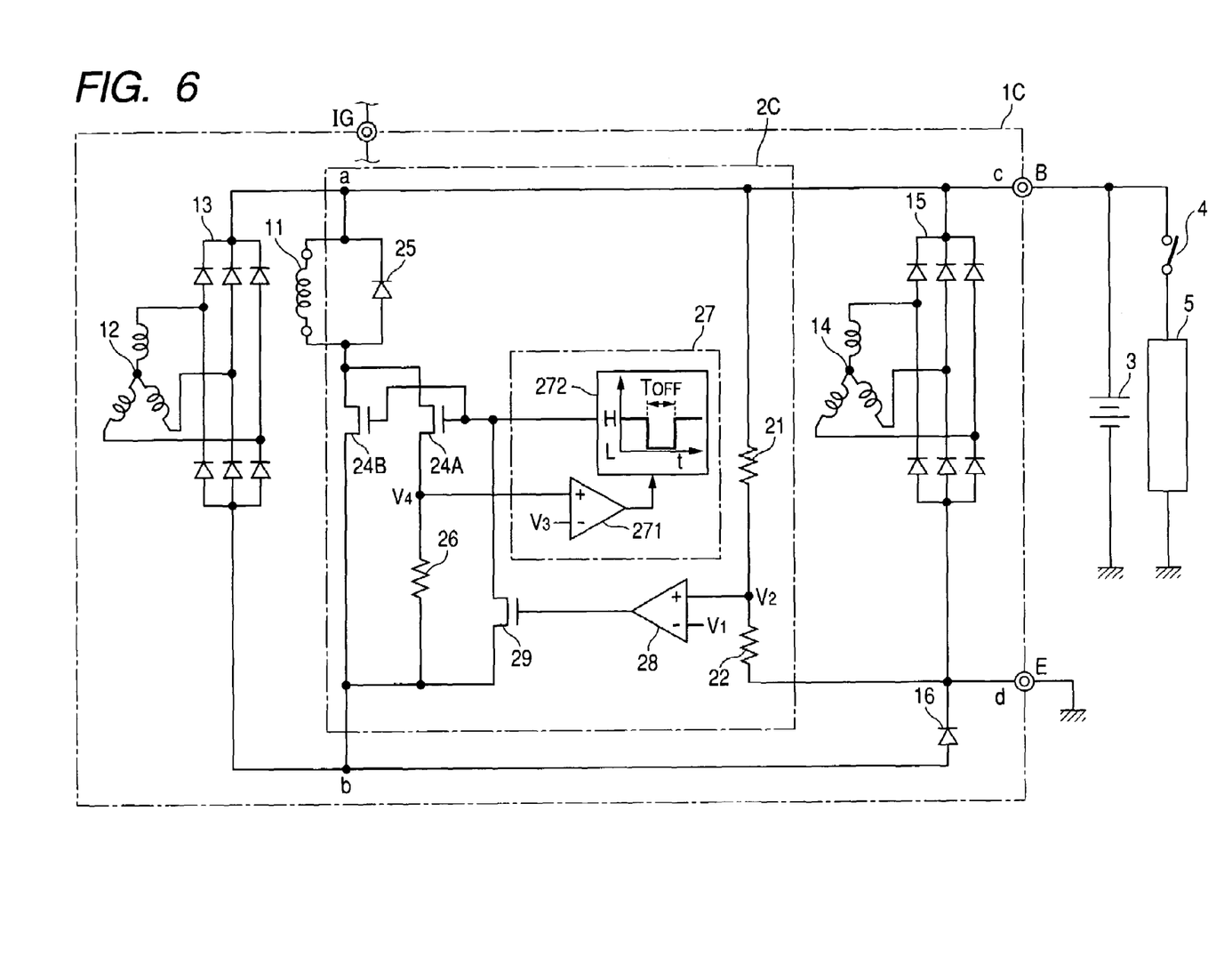
FIG. 6 is a block diagram showing a modification of the configuration for detecting excitation current, according to the fourth embodiment of the present invention.

Referring to FIGS. 4, 5, and 6, a fourth embodiment of the present invention will now be described.

4.1 Configuration

FIG. 4 is a block diagram showing a configuration of a fourth embodiment of the present invention. FIG. 4 also shows a state of electrical connection between the alternator, a battery, etc. In the present embodiment, the identical or similar components or processes are given the same references as in the first embodiment for the sake of simplification or omission of explanation.

As shown in FIG. 4, an alternator 1C of the present embodiment comprises the excitation winding 11, the excitation armature winding 12, the first rectifier (excitation rectifier) 13, the output armature winding 14, the second rectifier (output rectifier) 15, the rectifying element 16 and a power generation control unit 2C.

The alternator 1C of the present embodiment shown in FIG. 4 is different from the alternator 1 of the first embodiment shown in FIG. 1 in that the power generation control unit 2 of the first embodiment is replaced by the power generation control unit 2C. The power generation control unit 2C is different from the power generation control unit 2 in that the former is additionally provided with an excitation current detecting resistor 26 and an excitation current limiting circuit 27, and that, in the former, the voltage comparator 23 of the latter is replaced by a transistor 29 for controlling the gate of the switching element 24 and by a voltage comparator 28. With these changes, a drain of the transistor 29 is connected to the gate of the transistor 24. Also, a new electrical connection that has not been present in the first embodiment using the comparator 23 is established. Particularly, a source of the transistor 29 is connected to the excitation current detecting resistor 26 at the side of the node "b" shown in FIG. 4.

One end of the excitation current detecting resistor 26 is connected to the source of the switching element 24, and the other end thereof is connected to the node "b" (negative side of the first rectifier 13). When the switching element 24 is turned on, a potential difference V4 across the ends of the excitation current detecting resistor 26 (having a resistance Rs) is caused by a current that flows through a path in the order of the excitation winding 11→switching element 24→the excitation current detecting resistor 26. This potential difference V4 is detected as a voltage corresponding to the excitation current.

The excitation current limiting circuit 27 is provided with a comparator 271 and an OFF-circuit 272. The reference voltage V3 is inputted to a minus input terminal of the voltage comparator 271, and the potential difference V4 caused across the ends of the excitation current detecting resistor 26 is inputted to a plus input terminal thereof. The output of the voltage comparator 271 is inputted to the OFF-circuit 272.

When the potential difference V4 is lower than the reference voltage V3 (V4<V3), the OFF-circuit 272 outputs a high-level signal to turn on the switching element 24.

When the potential difference V4 becomes higher than the reference voltage V3 (V4>V3) and the high-level signal is inputted from the voltage comparator 271, the OFF-circuit 272 outputs a low-level signal for a predetermined period $T_{OFF}$ to turn off the switching element 24.

The period $T_{OFF}$ is set sufficiently smaller than a time constant τ of the excitation winding 11 to mitigate variation of the excitation current at the time when current is limited ($T_{OFF}$<τ). For example, the $T_{OFF}$ is set at about several milliseconds.

The reference voltage V1 is inputted to a minus input terminal of the voltage comparator 28, and the input voltage V2 that has been divided at the resistors 21 and 22 for detection of the output voltage of the alternator 1C is inputted to a plus input terminal of the voltage comparator 28. The output of the voltage comparator 28 is inputted to the transistor 29.

The transistor 29 plays a roll of controlling the switching element 24, with its gate being connected to the output terminal of the voltage comparator 28, its drain being connected the gate of the switching element 24, and with its source being connected to the node "b".

The excitation current detecting resistor 26 and the excitation current limiting circuit 27 constitute excitation current limiting means (which is also referred to as a "first controller"). Further, the resistors 21 and 22, the switching element 24, the voltage comparator 28 and the transistor 29 constitute voltage control means (which is also referred to as a "second controller").

4.2 Operations

<Operation Before Engine Startup>

Attention should be paid to the fact that the input voltage V2 for one of the two input terminals, i.e. the plus input terminal, of the voltage comparator 28 is rendered to be lower than the reference voltage V1 for the other input terminal, i.e. the minus input terminal, thereof (V2<V1). Therefore, the level of an output signal of the voltage comparator 28 becomes so low that the transistor 29 is turned off.

Attention should also be paid to the two input terminals of the voltage comparator 271. For example, it is to be assumed that the reference voltage V3 is set at a value corresponding to a predetermined excitation current I1 which is larger than the excitation current supplied from the battery 3 (a relation between the resistance Rs and the predetermined excitation current I1 is expressed by I1=V3/Rs).

Since the potential difference V4 across the ends of the excitation current detecting resistor 26 is lower than the reference voltage V3, a low-level signal is outputted from the voltage comparator 271 and the level of the output signal of the OFF-circuit 272 becomes so high as to turn on the switching element 24. Then, the excitation current, or the initial excitation current, is supplied from the battery 3 and passes through the excitation winding 11, the switching element 24, the excitation current detecting resistor 26 and the rectifying element 16 to thereby magnetize the rotor.

<Operation After Engine Startup>

When the engine is started and the rotor is rotated, a rotating magnetic field is created, by which an electromotive force of three-phase AC is produced in the excitation armature winding 12. Then, the first rectifier 13 full-wave rectifies the produced three-phase AC voltage, for conversion into DC voltage (excitation voltage Vab).

With the production of the excitation voltage Vab having larger potential difference than the battery voltage, the potential at the negative side of the first rectifier 13 becomes lower than the ground potential of the E terminal. In other words, the rectifying element 16 is reversely biased, and thus the initial excitation current that has been supplied from the battery 3 runs down. From this point onward, excitation current is supplied by the self-produced excitation voltage Vab, instead of being supplied from the battery 3.

In this way, the rotor is magnetized by the excitation current supplied by the excitation voltage Vab, so that the electromotive force of three-phase AC is produced in the output armature winding 14. Then the produced three-phase AC voltage is full-wave rectified by the second rectifier 15, for conversion into DC voltage (output voltage Vcd), whereby electric power is supplied to the battery 3 and the current consumer 5.

After that, when the output voltage Vcd has reached the regulated voltage (e.g., 14.5 V) to raise the input voltage V2 of the voltage comparator 28 higher than the reference voltage V1 (equivalent to the regulated voltage 14.5 V) (V2>V1), the output signal of the voltage comparator 28 turns from low level to high level to turn on the transistor 29. Gate voltage of the switching element 24 turns to a low level and the switching element 24 is turned off. As a result, the excitation current is circulated via the circulating diode 25 and reduced, whereby the output voltage Vcd of the alternator 1C is reduced.

When the input voltage V2 of the voltage comparator 28 becomes lower than the reference voltage V1 (V2<V1), the level of the output signal of the voltage comparator 28 becomes so low as to turn off the transistor 29. The level of the gate voltage of the switching element 24 becomes high so that the switching element 24 is again turned on to increase the excitation current.

In this way, by performing the on/off control of the switching element 24 for control of the excitation current flowing through the excitation winding 11, the output voltage Vcd of the alternator 1C is regulated to the predetermined regulated voltage.

An explanation is now given on the case where the current consumer 5 is under use while the vehicle is driven (i.e., the case where the switch 4 has been turned on).

<Operation in Low-speed Region>

If the power generation capacity of the alternator 1C is sufficiently large, the alternator 1C can charge the battery 3 and can supply power to the on-vehicle current consumer 5 with the output voltage Vcd controlled to be the predetermined regulated voltage (14.5 V).

If the current consumer 5 consumes electric power larger than the power generation capacity of the alternator 1C, the electric power is compensated by the battery 3. Therefore, the voltage of the battery 3 is reduced, by which the output voltage Vcd of the alternator 1C becomes lower than the predetermined regulated voltage (14.5 V). Since this allows the input voltage V2 of the voltage comparator 28 to become lower than the reference voltage V1 (V2<V1), the transistor 29 is turned off and the switching element 24 is turned on to allow the full excitation current to flow through the excitation winding 11.

The full excitation current produces an electromotive force larger than the output voltage Vcd in the excitation armature winding 12. At the same time, the excitation winding 11 is applied with the excitation voltage Vab which is allowed to be produced in the excitation armature winding 12 of the alternator IC (e.g., about 17V (>Vcd) for 1800 rpm of the alternator 1C, which is equivalent to the proximity of idle rotation number of an engine) without being limited by the output voltage Vcd which is supplied to the battery 3 or the current consumer 5 from the alternator 1C.

<Operation in High-speed Region>

When power is generated with the maximum power generation capacity and the rotor of the alternator 1C is rotated at high speed, an electromotive force is produced in the excitation armature winding 12 according to the number of revolutions to thereby produce much higher excitation voltage Vab. In order to suppress the excitation voltage Vab which becomes exceedingly large in such a high-speed region, an excitation current If is limited to a predetermined current I1.

In addition to the voltage control for regulating the output voltage of the alternator 1C, if a current passing through the excitation winding 11 is attempted to be controlled so as to allow an excitation voltage of another system to be also constant, the electric power supplied to the battery 3 and the current consumer 5 of the alternator 1C from the alternator 1C is adversely effected by the excitation current for making the excitation voltage to be constant. As a result, the excitation current will decrease or increase to allow the alternator 1C to carry on an operation with unstable output voltage. This is the reason why the excitation current If is limited to suppress the excitation voltage Vab.

FIGS. 5A to 5D are diagrams showing operation timing of the power generation control unit 2C in the high-speed region. With reference to FIGS. 4 and 5, the operation of the power generation control unit 2C is explained below, i.e. the operation for limiting the excitation current If, which is supplied from the first rectifier 13, to the predetermined current I1.

When the switching element 24 is turned on to pass the excitation current If, the potential difference V4 is caused across the ends of the excitation current detecting resistor 26. Further, when the potential difference V4 inputted to the voltage comparator 271 exceeds the reference voltage V3 (V4>V3) (see FIG. 5A), the high-level signal is outputted from the voltage comparator 271 (see FIG. 5B). In response, the OFF-circuit 272 is operated and outputs the low-level signal for the predetermined period $T_{OFF}$ (see FIG. 5C). Then, the level of the gate voltage of the switching element 24 turns low, whereby the switching element 24 is turned off to allow the exciting current to circulate via the diode 25 and be reduced (see FIG. 5D). With the expiration of the predetermined period $T_{OFF}$, the high-level signal is again outputted from the OFF-circuit 272 (see FIG. 5C). As a result, the level of the gate voltage of the switching element 24 turns high to again turn on the switching element 24 and increase the excitation current (see FIG. 5D).

4.3 Advantages

As described above, by repeating the predetermined-period operation for reducing the excitation current after detecting a limiting value (i.e. predetermined current), the excitation current If supplied to the excitation winding 11 is limited to substantially the predetermined current I1. Accordingly, the excitation voltage Vab is limited to a voltage value determined by the predetermined current I1, or the limiting value, of the excitation current and an impedance Zf of the excitation winding 11 (Vab=I1×Zf). It should be appreciated that the contribution of an ON-resistance of the transistor 24 and the resistance of the resistor 26 to the excitation voltage Vab is intended to be negligibly small comparing with the contribution of the excitation winding thereto.

In the low-speed region of the alternator 1C, a battery voltage higher than the excitation voltage Vab can be applied to the excitation winding 11. As a result, a rotor having a strong magnetizing force can be constituted. Thus, in comparison with an alternator having the conventional configuration in which electric power is generated with a voltage to be applied to the excitation winding 11 being limited by the battery voltage, the output current to be supplied from the output armature winding 14 to the battery 3 and the current consumer 5 can be increased in the present embodiment.

In the high-speed region of the alternator 1C, the excitation voltage Vab to be applied to the excitation winding 11 can be limited by limiting the excitation current to the predetermined value so as not to give adverse effect to the output current in the low-speed region. This can suppress heat evolution in the excitation winding 11, by which the insulating film of a copper wire constructing the excitation winding 11 can be prevented from being deteriorated.

Since the excitation current If is limited to the predetermined current I1 to limit the excitation voltage Vab, the output voltage control is enabled for both the excitation voltage Vab and the regulated voltage Vcd. Thus, the excitation voltage can be suppressed without allowing the excitation current to influence on the output electric power of the alternator to thereby suppress heat from being built up in the rotor (excitation winding).

The predetermined current limited by the excitation current limiting means (excitation current limiting circuit 27) mentioned above is preferably higher than a current that can be supplied by the battery.

Placing a limitation using such a second excitation current makes it possible to increase the output current in the low-speed region and to limit the excitation voltage Vab in the high-speed region, ensuring stable operation for a long period.

After detecting the second excitation current, the excitation current limiting means reduces current supplied to the excitation winding 11 for the predetermined period which is smaller than the time constant of the excitation winding 11.

Thus, when placing a limitation using the second excitation current, the output current supplied to the battery and the current consumer from the alternator can be stabilized by mitigating variation in the current that flows through the excitation winding.

The first to the fourth embodiments have advantages in common. Specifically, they are so arranged that the output of the first rectifier 13 to be applied to the excitation winding 11 is electrically separated from the output of the second rectifier 15 for supplying electric power to the battery 3 and the current consumer 5. Therefore, when the output voltage of the second rectifier 15 (output voltage of the alternator 1) becomes lower than the regulated voltage, high voltage producible by the excitation armature winding 12 can be applied to the excitation winding 11 by the first rectifier, without being limited by the output voltage. In this way, power generation capacity of the alternator can be increased.

Further, since the boosted voltage to be applied to the excitation winding can be produced with the incorporated simple configuration, the feasibility of loading the alternator 1 is not deteriorated. In addition, since the external separate power source for excitation can be omitted, the manufacturing cost, the size, and the weight of the electric generation system including the alternator 1 may be reduced.

4.4 Modification

The configuration for detecting the excitation current is not limited to the one shown in FIG. 4, i.e. the one in which the excitation current detecting resistor 26 is connected in series to the source side of the switching element 24. As shown in FIG. 6, switching elements 24A (e.g., SENSE-FET) and 24B may be used, by which a portion of the excitation current is shunted.

5. Other Modifications

The present invention is not limited to the first through the fourth embodiments described above, but may be modified in various ways within the spirit of the present invention.

In the embodiments described above, the voltage at the B terminal of the alternator 1, 1A, 1B or 1C has been divided by the resistors 21 and 22 to produce the input voltage V2. Alternatively, the terminal voltage at a plus terminal of the battery 3 may be taken in and divided by the resistors 21 and 22 to produce the input voltage V2, for example.

In the embodiments described above, the switching element 24 has been provided downstream (the side of E terminal opposed to the B terminal) of the excitation winding 11, but the switching element 24 may be provided upstream of the excitation winding 11. Although the rectifying element 16 has been provided external to the power generation control unit 2, 2A or 2C in FIG. 1, 2, 4 or 6, the rectifying element 16 may be internally provided.

In the embodiments described above, Y-connected excitation armature winding 12 and output armature winding 14 have been described. Alternatively, both of them may be Δ-connected, or one of them may be Y-connected and the other may be Δ-connected. For example, the excitation armature winding 12 may be Y-connected and the output armature winding 14 may be Δ-connected.

In the fourth embodiment described above, the excitation current detecting resistor and the excitation current limiting circuit 27 have been additionally provided comparing with the first embodiment, and the voltage comparator 23 has been replaced by the transistor 29 for controlling the gate of the switching element 24 and by the voltage comparator 28. Similar addition and replacement may be made in the second or third embodiment.

In the first to fourth embodiments, the alternators (1, 1A, 1B, and 1C) have two generating sections (12, 14). One generating section, 12 is provided for exciting the excitation winding 11 to allow the generating sections (12, 14) to generate electric power. The other generating section 14 is provided for outputting electric power from the output terminal of the alternators and supplying the electric power to the battery 3 and electric load 5. However, the alternators can be designed to have more than two generating sections. Even in such a modified case, the same design manner, which described in the first to fourth embodiments, enables a modified alternator having more than two alternator to bring about advantages of the first to fourth embodiments. Namely, the controller (2, 2A, 2B, and 2C) can, in principle, control a supplying amount of the electric power which is generated by the generating sections to both the excitation winding 11 and the output terminal B of the alternator based on a voltage generated by a specific generating section 12. The specific generating section 12 can supply a current to the excitation winding 11 for enabling each of the generating section to generate the electric power.

It will be appreciated that the present invention is not limited to the configurations described above, but any and all modifications, variations or equivalents, which may occur to those who are skilled in is the art, should be considered to fall within the scope of the present invention.

What is claimed is:

1. An alternator comprising:
a rotator having a magnetic pole and an excitation winding for exciting the magnetic pole;
a stator having a first and second stator windings, the first and second stator windings generating a first and second alternating current thereacross respectively in a rotating magnetic field generated by the rotator;
a first rectifier rectifying the first alternating current;
a second rectifier rectifying the second alternating current; and
a controller configured to control an amount of an output from the alternator based on an output voltage of the first rectifier.

2. The alternator recited in claim 1, wherein
the first stator winding is arranged to generate a first electric power and supply the first electric power to the excitation winding, and
the second stator winding is arranged to generate a second electric power and supply the second electric power to an electric load and/or a power source.

3. The alternator recited in claim 2, wherein the controller is configured to compare at least one of a first voltage output produced by the second rectifier and a second voltage across the power source with a predetermined voltage and enable the first rectifier to control supply of an electric power to the excitation winding based on a result of the comparison.

4. The alternator recited in claim 2, wherein,
the controller has a first and second controllers,
the first controller being configured to regulate a current flowing from the first rectifier to the excitation winding at a predetermined current, and
the second controller being configured to enable the first rectifier to control supply of an electric power therefrom to the excitation winding based on a compared result of a first voltage output by the second rectifier and/or a second voltage across the power source with a predetermined voltage.

5. The alternator recited in claim 4, wherein the predetermined current is a current greater than an excitation current supplied from the power source.

6. The alternator recited in claim 4, wherein the first controller is configured to suppress the excitation current for a time interval less than a time constant of the excitation winding after detecting the excitation current.

7. The alternator recited in claim 1, further comprising a third rectifier, the first and second rectifiers coupling to each other via the third rectifier.

8. The alternator recited in claim 7, wherein the third rectifier is configured to be forwardly biased when an output voltage of the first rectifier is lower than an output voltage of the second rectifier, and configured to be reversely biased when the output voltage of the first rectifier is higher than the output voltage of the second rectifier.

9. The alternator recited in claim 1, wherein the alternator is connected to a single power source.

10. The alternator recited in claim 9, wherein the single power source is rechargeable.

11. The alternator recited in claim 2, wherein, the power source is rechargeable.

* * * * *